UNITED STATES PATENT OFFICE.

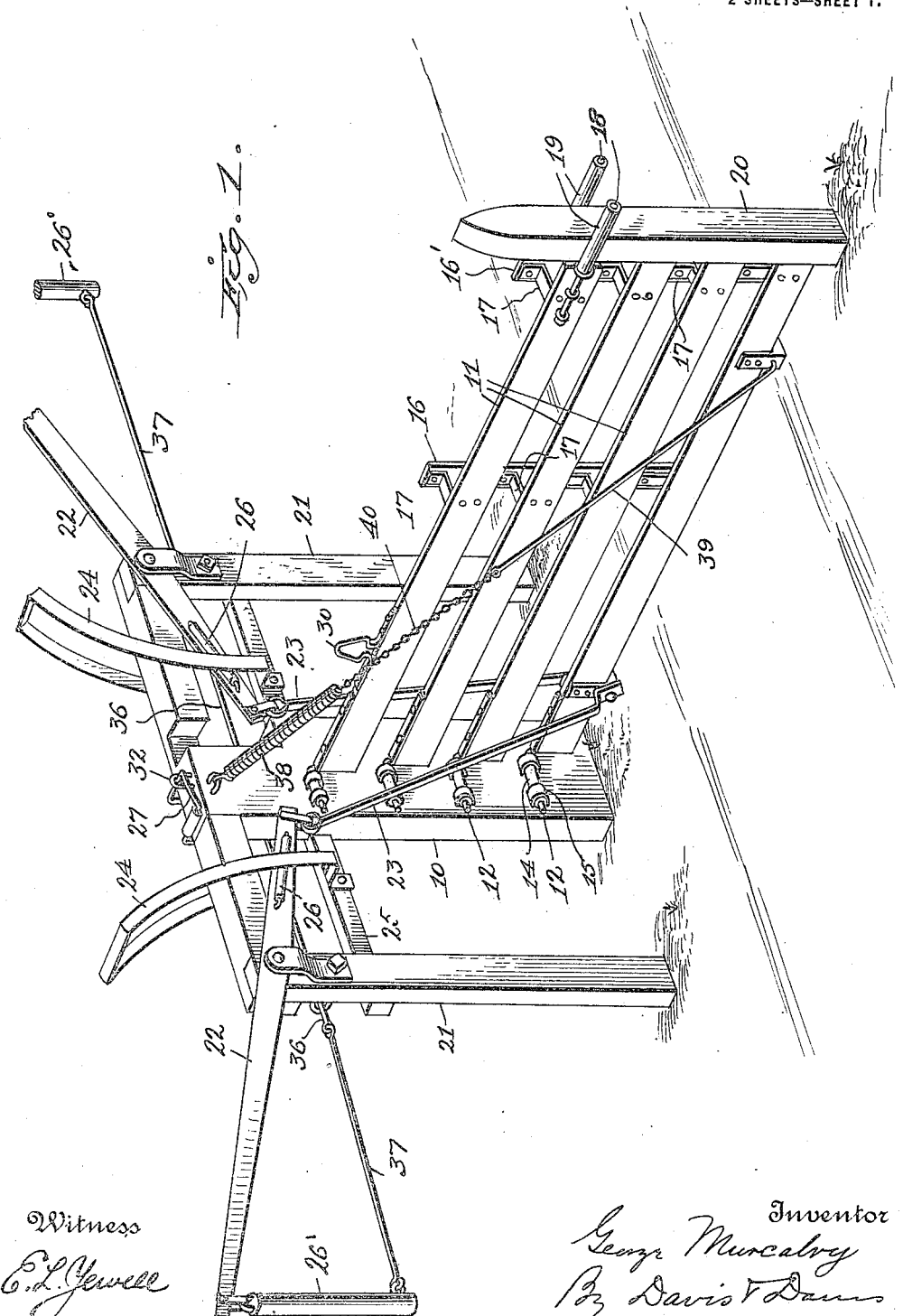

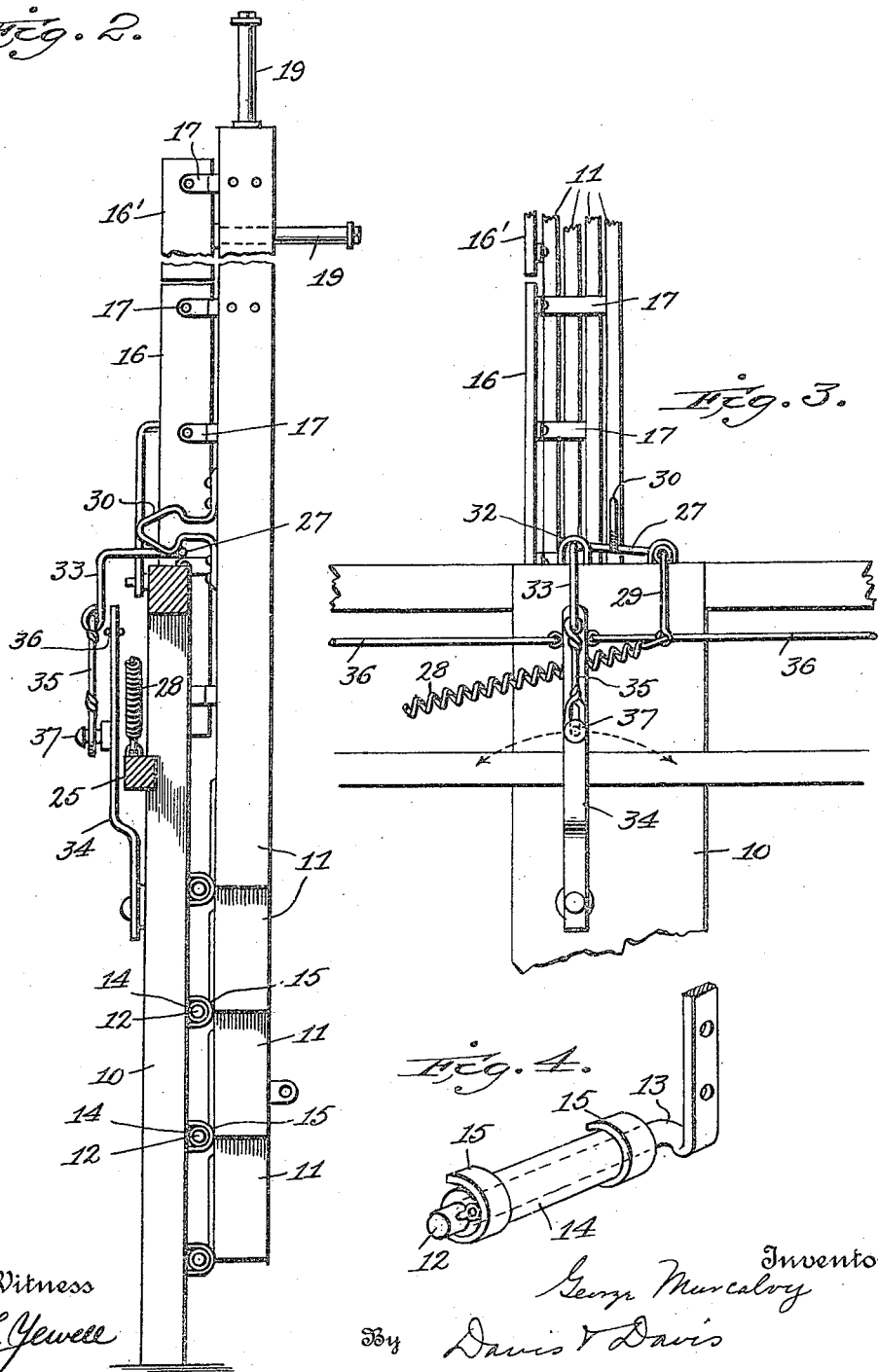

GEORGE MURCALVY, OF PRINCETON, ILLINOIS.

FARM-GATE.

1,259,039.　　　　Specification of Letters Patent.　　Patented Mar. 12, 1918.

Application filed December 13, 1916. Serial No. 136,613.

*To all whom it may concern:*

Be it known that I, GEORGE MURCALVY, a citizen of the United States of America, and a resident of Princeton, county of Bureau, State of Illinois, have invented certain new and useful Improvements in Farm-Gates, of which the following is a full and clear specification.

This invention relates to the class of gates which are operated to open position by levers extending on both sides of the gate, and has for its object to provide a device of simple construction which will fold into a narrow space and will also automatically assume a closed position when its retaining latch is released.

These and other objects are attained by the means illustrated in the accompanying drawings, in which:

Figure 1 is a perspective view of the improved gate shown in its closed position;

Fig. 2 is a side elevation of the gate in folded position, the main support being shown partly in section;

Fig. 3 is a view looking at the back of the main support showing the locking mechanism; and Fig. 4 is a detail perspective view of one of the gate hinges.

Similar reference numerals in all of the figures of the drawings designate like parts.

Referring to the drawings, 10 designates the main or hinge post to which the gate-bars 11 are secured. These bars are each provided with a pintle 12 at its rear end, the leaves of the pintles being preferably secured upon the top edges of the bars, and said leaves are offset from the axis of the pintles to form a short crank 13 for a purpose hereinafter described. The pintles are supported in elongated bearing sleeves 14 which are secured to the post 10 by staples 15, and the bars are mounted slightly offset from each other or out of vertical alinement, so that when folded they will rest one back of the other, as shown clearly in Fig. 2 of the drawings. To retain the free ends of the bars in parallel relation, brace bars 16, 16′ are provided which are pivoted to brackets 17 secured rigidly to the bars 16, said brackets decreasing in length from the top bar down, so that the brace bars will be vertically disposed close behind the bars when they are folded. Secured to the free end of the top bar and the top end of the brace 16′ are pintles 18, upon which are mounted elongated rollers 19. These rollers are spaced apart and project horizontally from the gate and are adapted to engage opposite sides of the keeper post 20. The top of the post 20 is beveled and adapted to be engaged by either one of the rollers 19 to guide the free end of the gate to its proper position.

Pivoted upon side posts 21, which are erected a slight distance from each side of the hinge post 10 and in alinement therewith, are the operating levers 22, which extend parallel with the road and at right angles to the gate. The operating levers are pivoted near their inner ends to thereby provide long arms at their outer ends to secure a sufficient leverage to readily lift the gate. The inner ends of the levers are connected to the lower bar of the gate by the links 23 which are pivoted at both ends to the levers and bar respectively. Guide yokes 24 are secured to a cross-bar 25 which is engaged by elongated rollers 26 mounted on the levers 22 adjacent their inner ends. At the outer ends of the levers 22 are pivotally suspended the hand-bars 26′ which extend downwardly within easy reach of an operator who might be riding or on foot. A downward pull upon the outer ends of the levers 22 will elevate the inner ends, and through the link connections 23 the lower bar of the gate will be lifted, and through the brace connections 16 and 16′ the other bars will also be lifted until said bars reach the folded position shown in Fig. 2 of the drawings. The gate is automatically locked to the post 10 in its folded position by a spring-lock or latch, the same comprising a lock-bar 27 pivotally mounted on the top of the post 10 and normally retained in latching position by a spring 28 secured to the free end 29 of the bar and a stationary part of the gate. The lock-bar is adapted to be engaged by a keeper 30 mounted on the top edge of the top bar of the gate and having a head formed with an inclined face and a depression at the rear thereof and which is adapted to gradually depress the lock-bar 27 until the depression is reached, when the lock-bar will rise in the depression and prevent the gate from falling to a closed position. A staple 32 is provided for limiting the upward movement of the lock-bar 27. To release the gate from the locked position, another free end 33 of the lock-bar is extended backwardly and downwardly to the rear of the post 10 and is connected to a lever 34 by a link 35, said lever being pivoted at its lower end to the back of the post 10 and having connected to its upper end the rods 36 which extend in opposite directions and are slidably mounted on the back of the main support. The free ends of the rods 36 are connected to the hand-bars 26' by the links 37. The lower end of the link 35 has a slotted connection with the pivot 37 connecting it to the lever 34, so that the lock-bar can be depressed when the lever 34 is in its normal vertical position without moving the lever.

It will be observed that when the bars are in a folded position, the crank arms 13 of the pintles 12 extend laterally from the post. The weight of the bars thereon has a tendency to turn the pintles in their bearing sleeves; therefore, when the lock-bar is operated to releasing position by pulling either one of the hand-bars 26' in a direction away from the gate, the locking head will be released and the bar will automatically drop to a closed position. To ease the downward movement of the bars, the free end of the gate is preferably supported from the hinge post 10 by a tension member comprising a spring 38 and a rod 39 connected together by a chain 40. The tension of the spring is sufficient to support the free end of the gate, so that when it reaches its lowermost position it will stop falling. The links of the chain can be adjusted to shorten the tension member when desired.

In operation, with the gate closed as shown in Fig. 1, a person approaching at either side pulls down upon the adjacent hand-bar and opens the gate by folding the bars as shown in Fig. 2. After passing through the gate, by pulling the other hand-bar in a direction away from the post, the lock-bar is released and the gate automatically falls to closed position. Thus it will be observed that the hand-bars 26' serve two purposes, viz., to lift the gate when pulled downwardly, and to release the lock-bar when moved laterally.

Having thus described my invention, what I claim is:

A gate comprising a hinge-post, a plurality of horizontal gate-bars hinged separately to said post to swing upwardly to a vertical folded position one back of the other, a brace-bar having a pivoted connection with each gate-bar, a lock for retaining said gate-bars in their folded positions, means for raising said gate-bars and releasing said lock, said gate-bars being mounted on their hinges to fall automatically when said lock is released, a keeper-post, a pair of horizontally extending rollers on the free end of said gate adapted for engagement with opposite sides of said keeper-post, and a spring suspension means for the free end of the gate.

In testimony whereof I hereunto affix my signature.

GEORGE MURCALVY.

Copies of this patent may be obtained for five cents each, by addressing the "Commissioner of Patents, Washington, D. C."